(12) United States Patent
Nishizawa et al.

(10) Patent No.: US 11,541,749 B2
(45) Date of Patent: Jan. 3, 2023

(54) MOVING BODY DRIVE UNIT AND MOVING BODY

(71) Applicant: Kanzaki Kokyukoki Mfg. Co., Ltd., Hyogo (JP)

(72) Inventors: Takashi Nishizawa, Hyogo (JP); Koji Kiyooka, Hyogo (JP); Tasuku Inoue, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 531 days.

(21) Appl. No.: 16/660,114

(22) Filed: Oct. 22, 2019

(65) Prior Publication Data

US 2020/0122573 A1 Apr. 23, 2020

(30) Foreign Application Priority Data

Oct. 22, 2018 (JP) .............................. JP2018-198605

(51) Int. Cl.
| | |
|---|---|
| *B60K 17/16* | (2006.01) |
| *B62D 3/12* | (2006.01) |
| *B60K 7/00* | (2006.01) |
| *B60K 17/24* | (2006.01) |
| *B62D 1/20* | (2006.01) |
| *B60K 1/04* | (2019.01) |

(52) U.S. Cl.
CPC ............ *B60K 17/16* (2013.01); *B60K 7/0007* (2013.01); *B60K 17/24* (2013.01); *B62D 1/20* (2013.01); *B62D 3/12* (2013.01); *B60K 1/04* (2013.01)

(58) Field of Classification Search
CPC ...... B60K 17/16; B60K 7/0007; B60K 17/24; B62D 1/20; B62D 3/12
See application file for complete search history.

(56) References Cited

U.S. PATENT DOCUMENTS

| 8,936,120 | B2 | 1/2015 | Takagi | |
|---|---|---|---|---|
| 9,126,581 | B2 * | 9/2015 | Swales | ................ F16H 57/0441 |
| 9,130,412 | B2 * | 9/2015 | Tamura | .................. B60K 17/16 |

(Continued)

FOREIGN PATENT DOCUMENTS

| JP | S48083509 U | 10/1973 |
|---|---|---|
| JP | S63275430 A | 11/1988 |

(Continued)

OTHER PUBLICATIONS

UPO Notice of Reasons for Refusal for corresponding JP Application No. 2018-198605; dated Feb. 22, 2022.

*Primary Examiner* — Tony H Winner
(74) *Attorney, Agent, or Firm* — Cantor Colburn LLP

(57) ABSTRACT

A moving body drive unit has an electric motor that is located inside the case and has a motor shaft extending in a first direction, a gear shaft that is located, inside the case, parallel to the motor shaft so as to extend in the first direction and has a bevel gear formed thereon, an intermediate gear mechanism that transmits power from the motor shaft to the gear shaft, and a differential gear device that is located inside the case and has a ring gear that meshes with the bevel gear to transmit power from the gear shaft to two output shafts extending in a second direction. The motor shaft and the gear shaft are arranged at different positions in both the second direction and in a third direction that is orthogonal to both the first direction and the second direction.

2 Claims, 9 Drawing Sheets

(56) References Cited

U.S. PATENT DOCUMENTS

| | | | |
|---|---|---|---|
| 2002/0003058 A1* | 1/2002 | Hori | B60K 17/00 |
| | | | 180/233 |
| 2002/0086763 A1* | 7/2002 | Kobayashi | B60K 17/344 |
| | | | 475/198 |
| 2009/0160274 A1* | 6/2009 | Aikawa | B60K 17/16 |
| | | | 903/909 |
| 2010/0248888 A1 | 9/2010 | Hamperl et al. | |
| 2012/0247856 A1* | 10/2012 | Shinde | B62K 5/025 |
| | | | 180/216 |
| 2013/0168174 A1* | 7/2013 | Takagi | B60K 6/52 |
| | | | 180/65.6 |
| 2013/0190124 A1* | 7/2013 | Gassmann | B60K 1/00 |
| | | | 475/150 |
| 2014/0128192 A1* | 5/2014 | Korenaga | B60K 17/14 |
| | | | 475/5 |

FOREIGN PATENT DOCUMENTS

| | | |
|---|---|---|
| JP | 2010500942 A | 1/2010 |
| JP | 2015036288 A | 8/2013 |

\* cited by examiner

MOVING BODY DRIVE UNIT AND MOVING BODY

CROSS REFERENCE TO RELATED APPLICATION

The present invention claims priority under 35 U.S.C. § 119 to Japanese Patent Application No. 2018-198605 filed on Oct. 22, 2018, the entire content of which is incorporated herein by reference.

TECHNICAL FIELD

The present disclosure relates to a moving body drive unit and a moving body.

BACKGROUND

As disclosed in U.S. Pat. No. 8,936,120 B, it has been known to dispose an electric motor on the front side of a vehicle (moving body) and transmit power generated by the electric motor to right and left front wheels via a front differential gear device and right and left axles, to thereby rotate the front wheels. In this arrangement, the electric motor is located in front of the front differential gear device. The upper portion of the electric motor is inclined frontward from the front differential gear device. Power from the front motor is input to a differential bevel gear mechanism of the differential gear device via a gear mechanism and a gear shaft, and then transmitted from right and left output side rotation members to the right and left axles.

In the front wheel drive device used in the vehicle disclosed in U.S. Pat. No. 8,936,120 B, an output shaft (motor shaft) of the electric motor and the gear shaft located on the input side of the differential gear device are arranged in parallel in the right and left direction. This increases the right-and-left direction size of the moving body drive unit including the electric motor, the differential gear device, and a case containing them, around the output shaft and the gear shaft. Accordingly, upon positioning the moving body drive unit in the vehicle, it is impossible to dispose the electric motor on the rear side of the differential gear device because this may cause interference with the surrounding components. In consideration of this, in the arrangement disclosed in U.S. Pat. No. 8,936,120 B, the electric motor is located in front of the front differential gear device such that the upper side of the electric motor is inclined frontward. However, this makes the center of gravity of the vehicle higher, and the center of gravity tends to be located on the front side of the center position between the front wheels and the rear wheels in the front-and-rear direction. This causes deterioration in the maneuverability and the stability of the vehicle.

In addition, when the moving body drive unit described above is located such that the output shaft of the electric motor and the gear shaft extend in the vehicle front-and-rear direction, and when the up-and-down direction size of the moving body drive unit increases around the output shaft and the gear shaft, the moving body drive unit and parts that are located on the upper side of the moving body drive unit tend to interfere with each other. Particularly, the upper side of the moving body drive unit tends to be interfered with by a steering effort converting mechanism that is located below the steering shaft and converts the force in the rotational direction of the steering shaft to the force for steering the front wheels. It may thus be impossible to dispose the moving body drive unit in the vehicle without an interference with the surrounding parts.

SUMMARY

An object of the present disclosure is, for a moving body and a moving body drive unit used to drive two right and left front wheels of the moving body, to reduce the size of the moving body drive unit in the right-and-left direction and in the up-and-down direction around the motor shaft and the gear shaft when the motor shaft and the gear shaft are arranged to extend in the front-and-rear direction of the moving body.

The moving body drive unit according to the present disclosure is a moving body drive unit used for driving two right and left front wheels of a moving body, the moving body drive unit including a case, an electric motor that is located, inside the case, on one side in a predetermined first direction and has a motor shaft extending in the first direction, a gear shaft that is located, inside the case, parallel to the motor shaft so as to extend in the first direction and has a bevel gear formed on the other side in the first direction, an intermediate gear mechanism that transmits power from the motor shaft to the gear shaft, and a differential gear device that is located, inside the case, on the other side in the first direction and has a ring gear that meshes with the bevel gear to transmit power from the gear shaft to two output shafts that are arranged separately on both sides in a second direction orthogonal to the first direction and extend in the second direction. In this moving body drive unit, the motor shaft and the gear shaft are arranged at different positions in both the second direction and in a third direction that is orthogonal to both the first direction and the second direction.

The moving body according to the present disclosure is a moving body including right and left steerable front wheels and at least one rear wheel, the moving body including the moving body drive unit according to the present disclosure, right and left axles respectively connected between the right front wheel and a right output shaft and between the left front wheel and a left output shaft, a steering shaft connected to a steering wheel, and a steering effort converting mechanism that is located below the steering shaft and converts the force in the rotational direction of the steering shaft to the force for steering the two front wheels. In this moving body, the case has a recess formed, in an upper surface as an outer surface on one side in the third direction, at an intermediate portion in the front-and-rear direction as the first direction, and at least a portion of the steering effort converting mechanism is located inside the recess.

With a moving body drive unit and a moving body according to the present disclosure, it is possible to reduce the size of the moving body drive unit in the right-and-left direction and in the up-and-down direction around the motor shaft and the gear shaft when the motor shaft and the gear shaft are arranged to extend in the front-and-rear direction of the moving body.

BRIEF DESCRIPTION OF DRAWINGS

An embodiment of the present disclosure will be described based on the following figures, wherein.

DESCRIPTION OF EMBODIMENTS

Figure 1:
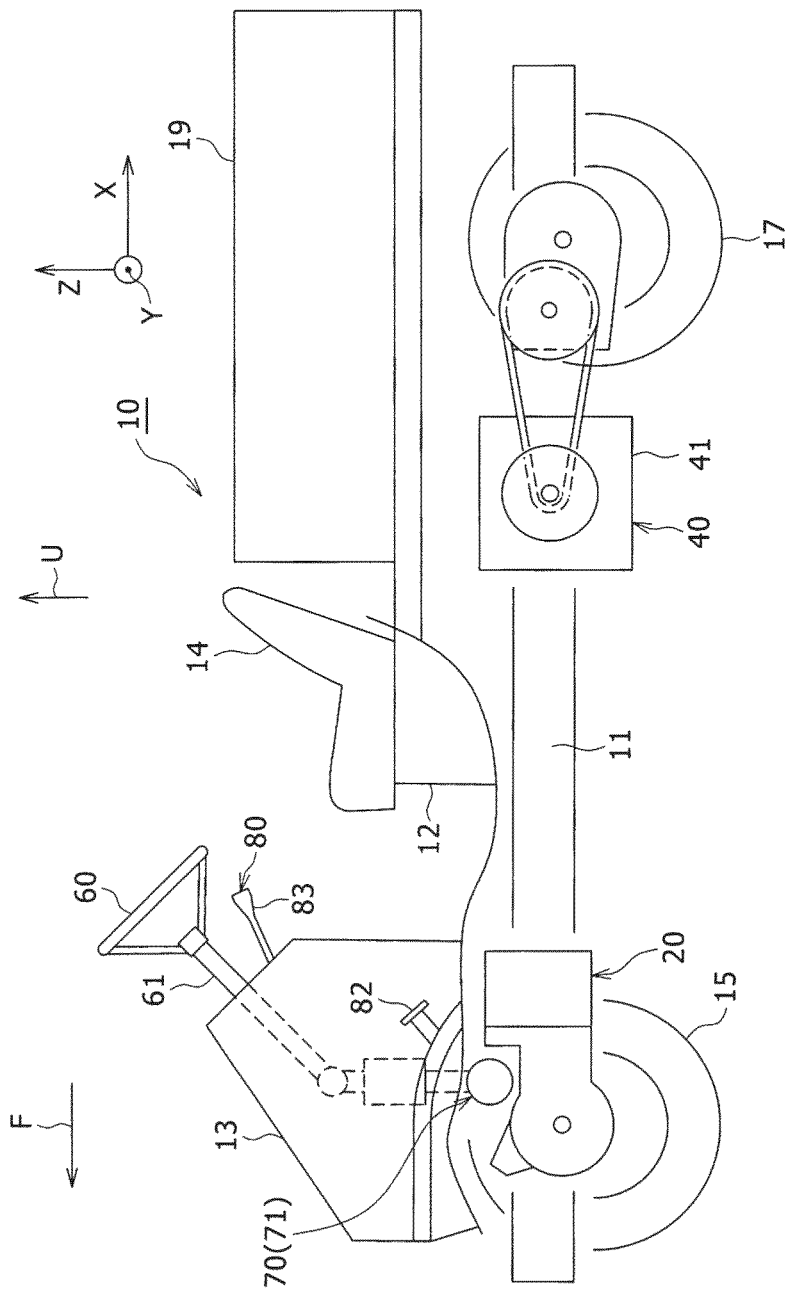
FIG. 1 is a side view of a vehicle which is a moving body in which a moving body drive unit according to an embodiment of the present disclosure is installed.

An embodiment of the present disclosure will now be described in detail with reference to the drawings. Hereinafter, the description will be given of the case where a moving body in which a moving body drive unit is installed is an off-road utility vehicle with a cargo bed for traveling on irregular ground, such as forests, wetlands, wastelands, rock mountains and so on. However, the moving body may be a work vehicle with a work machine for performing any one or more of snow removal work, excavation work, construction work, and agricultural work, or may be an all-terrain vehicle (ATV) called a buggy, a recreational vehicle (RV), or a recreational off-highway vehicle (ROV). In addition, the moving body only needs to have right and left steerable front wheels and at least one rear wheel. The same components will be labeled with the same reference numerals in all the figures.

Figure 2:
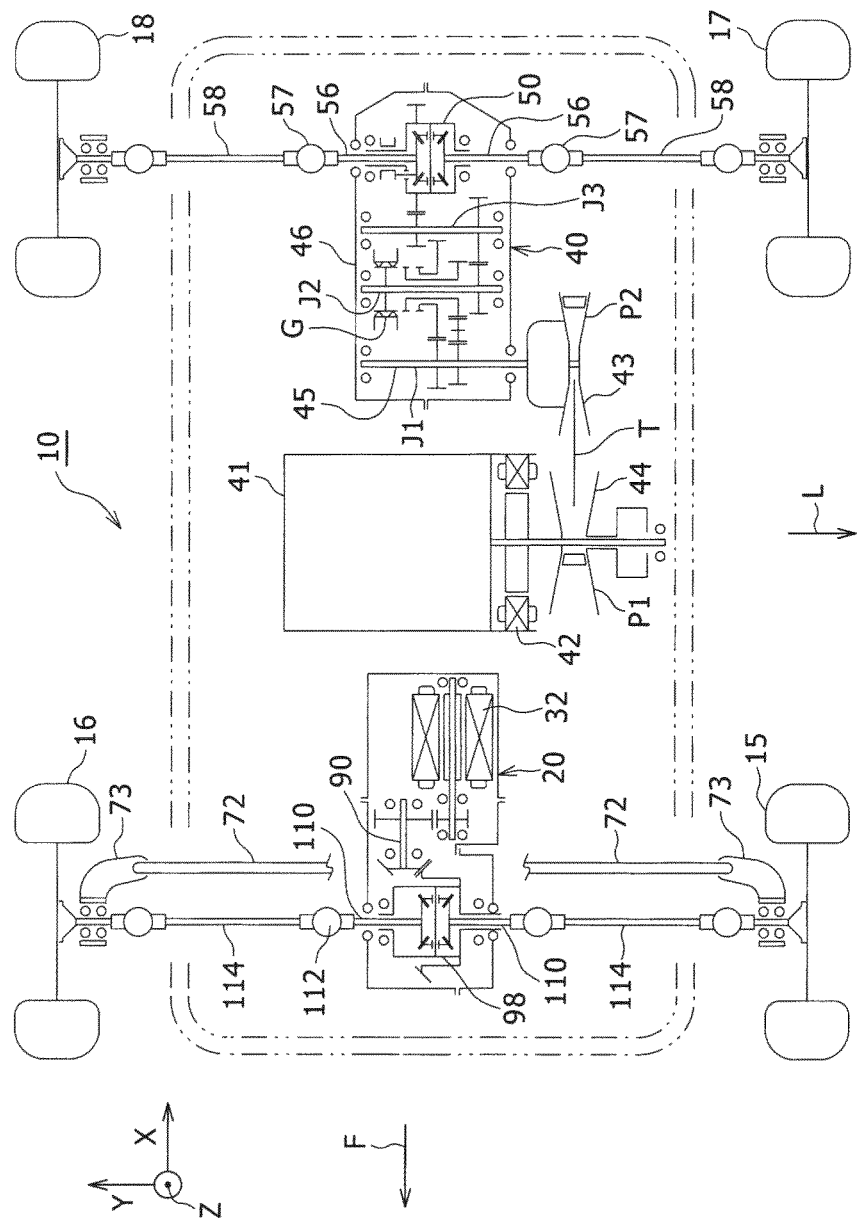
FIG. 2 is a view showing an overall structure of the vehicle in FIG. 1.
Figure 3:
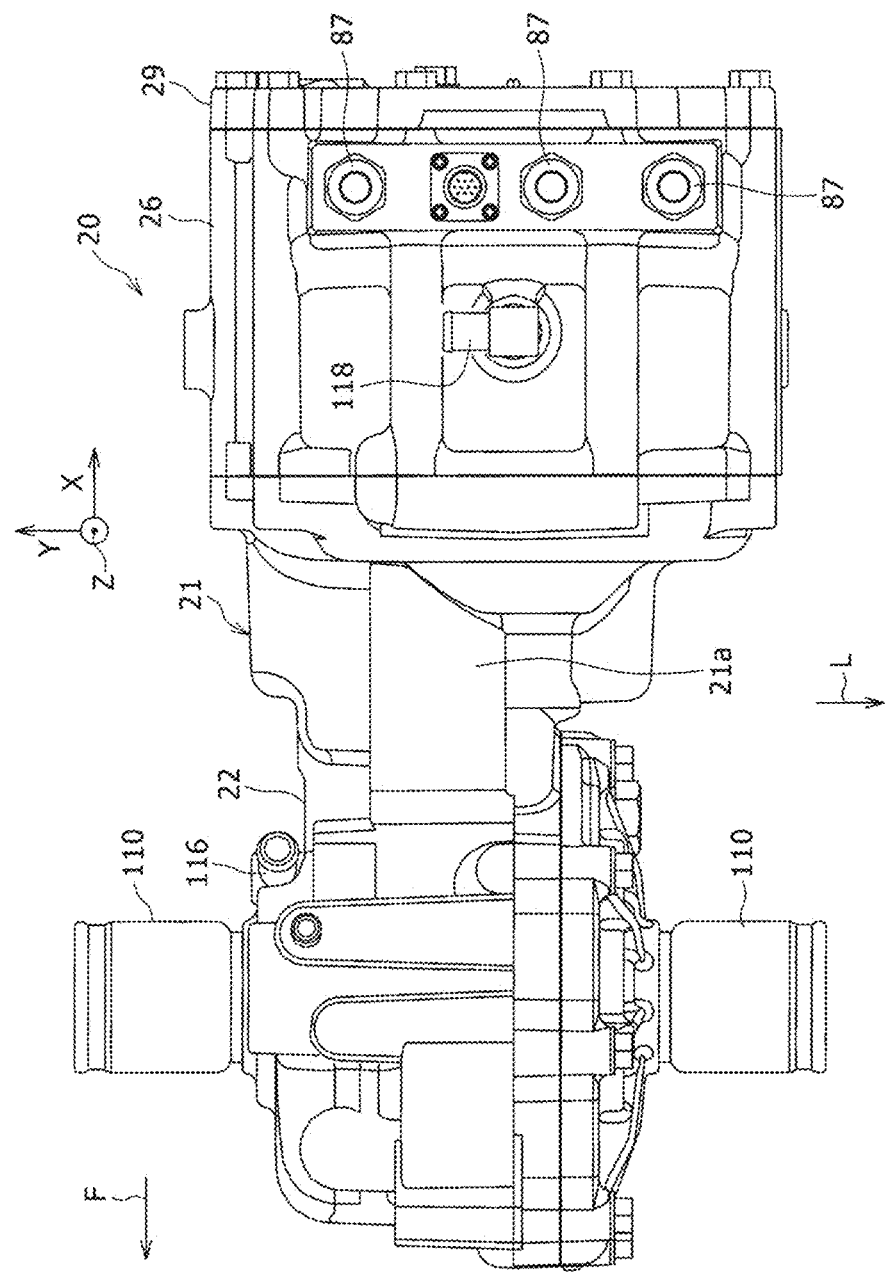
FIG. 3 is a view of the moving body drive unit according to the embodiment viewed from above.
Figure 4A:
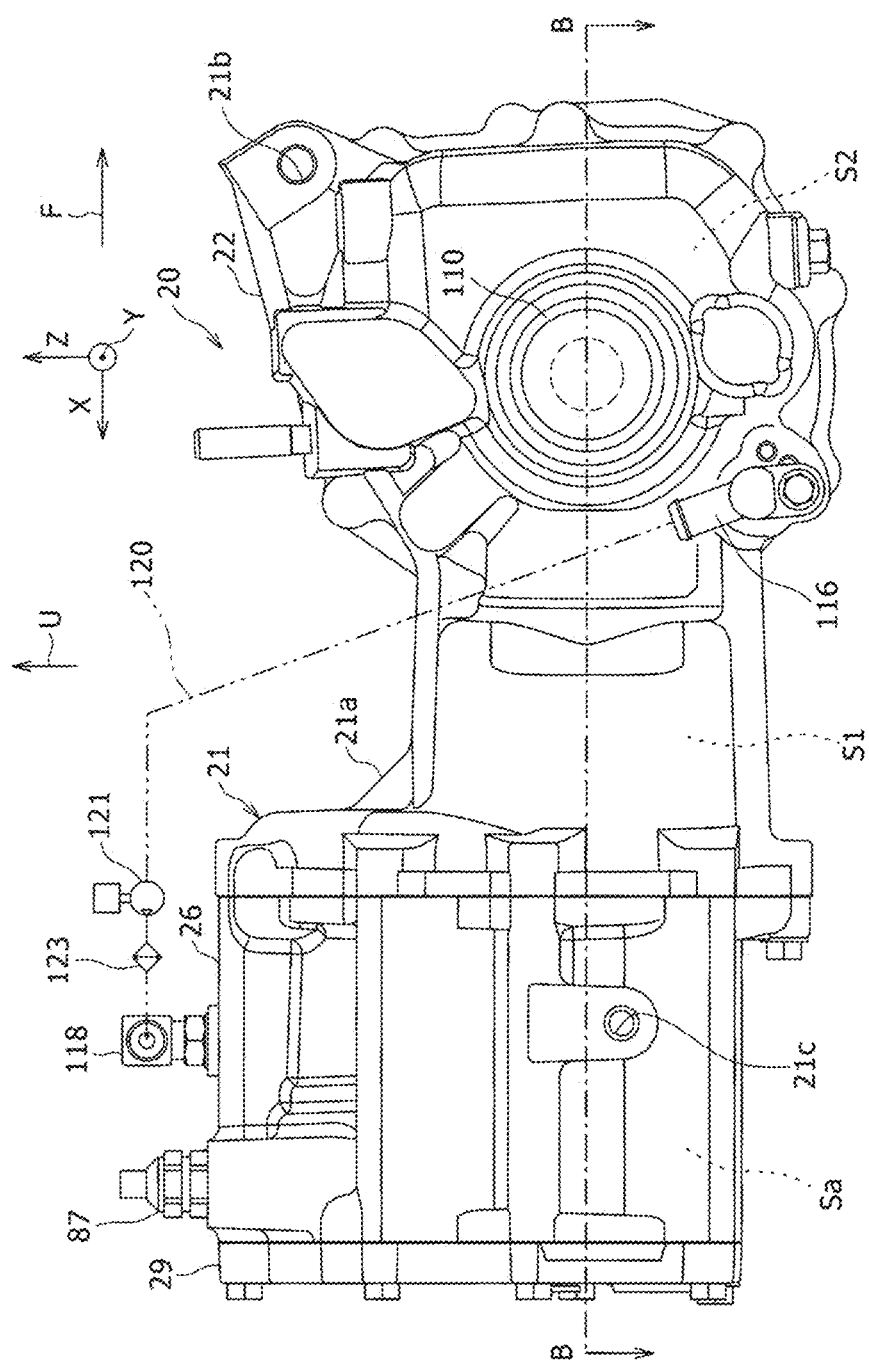
FIG. 4A is a view of the moving body drive unit in FIG. 3 viewed from the right side.
Figure 4B:
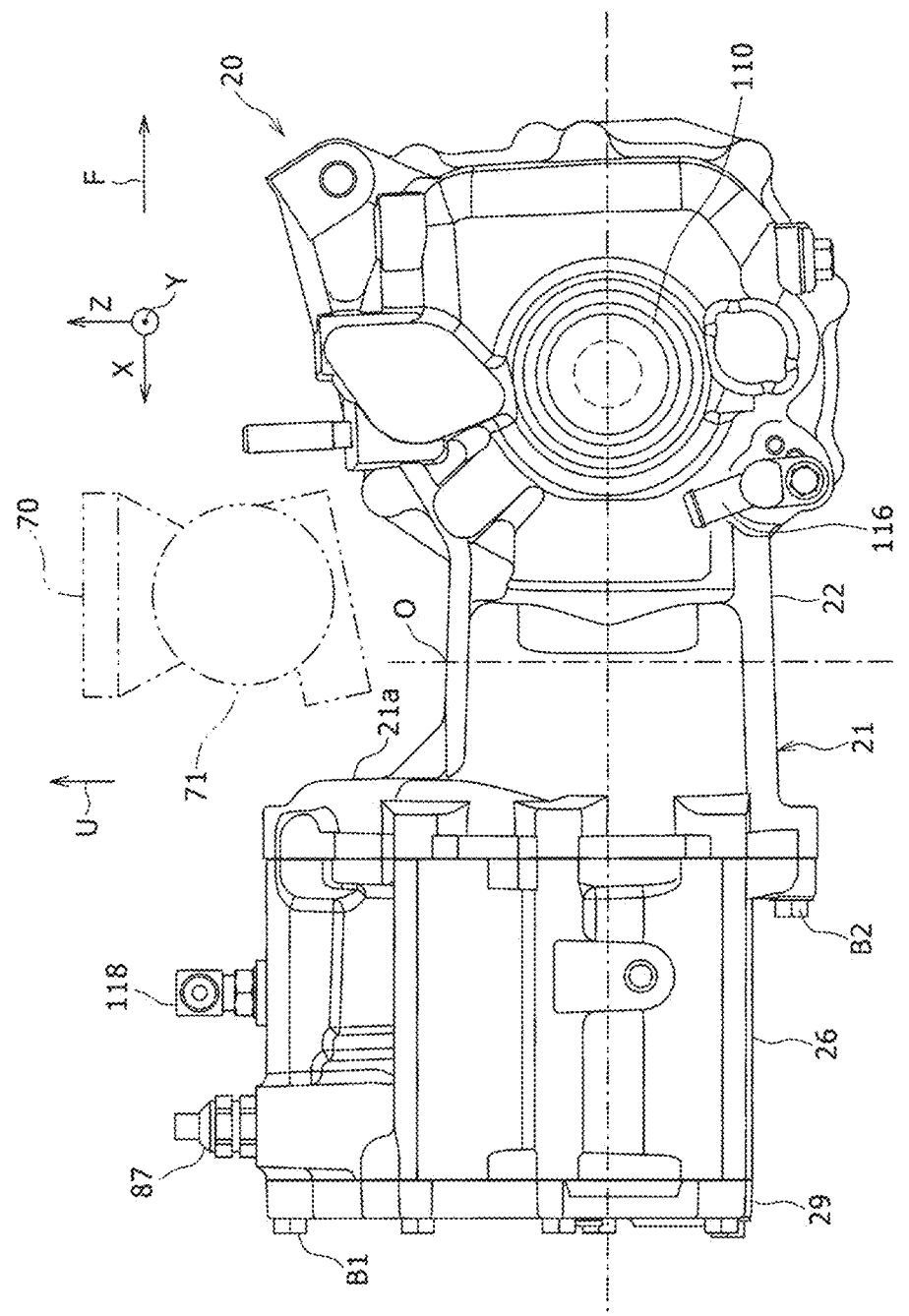
FIG. 4B is a view showing a positional relationship between a rack portion constituting a rack and pinion mechanism and the moving body drive unit in FIG. 4A.
Figure 5:
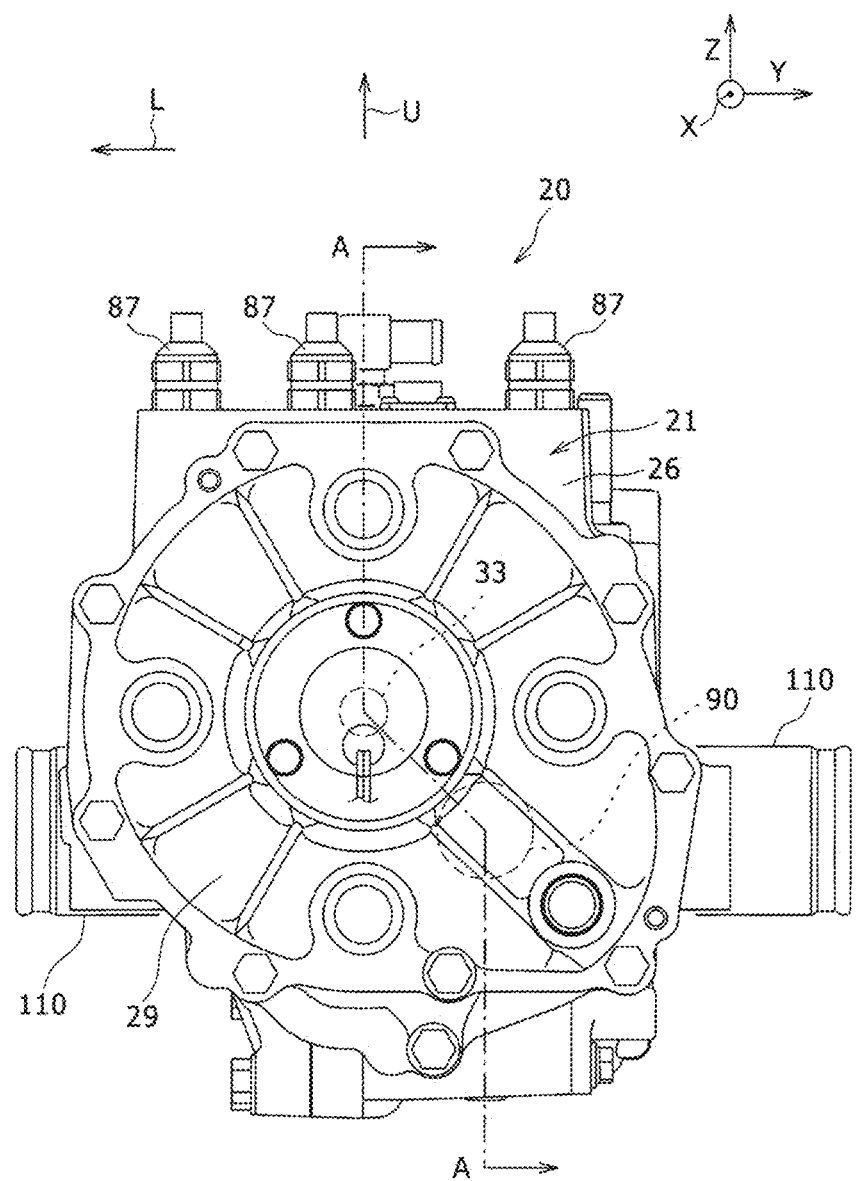
FIG. 5 is a view of the moving body drive unit in FIG. 3 viewed from the rear side.

FIG. 1 to FIG. 8 show an embodiment. FIG. 1 is a side view of a vehicle 10 which is a moving body in which a moving body drive unit 20 according to the embodiment is installed. FIG. 2 is a view showing an overall structure of the vehicle 10. FIG. 3 is a view of the moving body drive unit 20 viewed from above. FIG. 4A is a view of the moving body drive unit 20 viewed from the right side. FIG. 4B is a view showing a positional relationship between a rack portion 71 constituting a rack and pinion mechanism 70 and the moving body drive unit 20 in FIG. 4A. FIG. 5 is a view of the moving body drive unit 20 viewed from the rear side. In the drawings described below, the front-and-rear direction, the right-and-left direction, and the up-and-down direction are respectively indicated by X, Y, and Z. The front side, the left side, and the upper side are also respectively indicated by F, L, and U. The front-and-rear direction X, the right-and-left direction Y, and the up-and-down direction Z respectively correspond to a first direction, a second direction, and a third direction. X, Y, and Z are orthogonal to one another.

In the vehicle 10 shown in FIG. 1, a platform 12 which is a base structure is fixed above a frame 11 constituting a vehicle body, and a front cover 13 is fixed on the front side of the frame 11 (left side in FIG. 1). On the platform 12, a driver's seat 14 is fixed on the rear side of the front cover 13, and a cargo bed 19 is fixed on the rear side of the driver's seat 14. The vehicle 10 has wheels on both sides in the front-and-rear direction which is a traveling direction. More specifically, the vehicle 10 has two right and left front wheels 15 and 16 and two right and left rear wheels 17 and 18 that are supported on both sides in the front-and-rear direction of the frame 11, and moving body drive units 20 and 40 arranged on both front and rear sides of the vehicle 10.

As shown in FIG. 2, the front moving body drive unit 20 is used to drive the two right and left front wheels 15 and 16 with power of an electric motor 32 which is a power source. The rear moving body drive unit 40 is used to drive the right and left rear wheels 17 and 18 with power of an engine 41 which is a power source. The moving body drive units 20 and 40 will be described in more detail below.

The vehicle 10 includes a steering wheel 60 for steering the two front wheels 15 and 16, a steering shaft 61, the rack and pinion mechanism 70 (FIG. 4B), and right and left rod portions 72 (FIG. 2). The rack and pinion mechanism 70 corresponds to the steering effort converting mechanism. The steering wheel 60 is a member for instructing the vehicle to turn. The steering shaft 61 protrudes diagonally backward on the upper side of the front cover 13, and the steering wheel 60 is connected to an upper end portion of the steering shaft 61. The steering shaft 61 is connected to the right and left front wheels 15 and 16 via the known rack and pinion mechanism 70 and the rod portions 72 so that it can steer the front wheels 15 and 16. The rack and pinion mechanism 70 is located below the steering shaft 61 and fixed to the vehicle body. More specifically, the rack and pinion mechanism 70 is connected to a lower end portion of the steering shaft and has a pinion portion (not shown) having a pinion gear and the rack portion 71 located below the pinion portion and having a rack gear. The rack gear extends in the right-and-left direction Y and is movable in the right-and-left direction Y. Outer end portions of the rack gear in right-and-left direction Y are respectively connected to the right and left rod portions 72. The two rod portions 72 are connected to steering knuckle arms 73 extending from rotation support portions of the right and left front wheels 15 and 16. When the rod portions 72 move in the right-and-left direction Y, the steering angle of the front wheels 15 and 16 is changed. Thus, the rack and pinion mechanism 70 converts the force in the rotational direction of the steering shaft 61 to the force for steering the two front wheels 15 and 16. Therefore, according to the instructions from the driver as a user through the steering wheel 60, the direction of the two front wheels 15 and 16 is changed. It is also possible to adopt an arrangement where a hydraulic motor or an electric motor assist device is interposed between the steering shaft 61 and the rack and pinion mechanism 70.

As described above, the rack and pinion mechanism 70 is located below the steering shaft 61, and the front moving body drive unit 20 is also located below and around the steering shaft 61. The moving body drive unit 20 is therefore located so as to prevent interference with the rack and pinion mechanism 70 as described below.

The vehicle 10 also includes an operating element group 80, a battery (not shown) which is a power supply, a generator 42 (FIG. 2) driven by the engine 41 for generating electric power stored in the battery, and a controller (not shown).

The operating element group 80 includes an accelerator pedal 82 which is an acceleration instruction unit provided on the front side of the driver's seat, a brake pedal (not shown) which is a braking instruction unit, and a forward-reverse lever 83 provided on the front side of the driver's seat 14. The accelerator pedal 82 is a member for instructing acceleration according to the driver's operation. The controller starts the engine 41 in response to the operation of a starting switch (not shown) and controls the electric motor 32 (FIG. 2) and the degree of opening of a throttle valve of the engine 41 in response to the operation of the accelerator pedal 82. That is, control is carried out such that as the operation amount of the accelerator pedal 82 increases, the rotational speed of the electric motor 32 increases, and the degree of opening of the throttle valve increases.

The forward-reverse lever 83 is configured to be switchable between three operational positions, a forward position (F position), a neutral position (N position), and a reverse position (R position). The forward-reverse lever 83 is supported by the vehicle body such that it can move in a swingable manner in the front-and-rear direction. The forward-reverse lever 83 may be a shift lever that can switch forward travel into a plurality of stages of travel speed ranges, such as high-speed and low-speed ranges. The position of the forward-reverse lever 83 is detected by a lever position sensor (not shown), and the resulting detection signal is transmitted to the controller. The controller switches the rotational direction of the electric motor 32 according to the position of the forward-reverse lever 83. The forward-reverse lever 83 is also connected to a slide gear G (FIG. 2) in the rear moving body drive unit 40 described below, and by switching the forward-reverse lever 83, the rotational direction of power transmitted to the rear differential gear device 50 (FIG. 2) is switched.

As shown in FIG. 2, the rear moving body drive unit 40 is configured to include the engine 41, a power transmission unit 43, and two right and left output shafts 56. The engine 41 is fixed, on the frame 11, below the cargo bed 19 on the rear side of the driver's seat 14. The engine 41 may be one of a plurality of types of engine including a gasoline engine and a diesel engine. Power from the engine 41 is transmitted to the right and left rear wheels 17 and 18 via the power transmission unit 43, thereby driving the two rear wheels 17 and 18.

The power transmission unit 43 includes a CVT 44 which is a belt type continuously variable transmission device, a gear transmission device 45, and a differential gear device 50. The power transmission unit 43 is connected between the engine 41 and the rear wheels 17 and 18 so that it can transmit power from the engine 41 to the rear wheels 17 and 18.

The CVT 44 is a belt CVT that performs continuously variable transmission by changing the tension of the belt using an electric actuator. The CVT 44 is formed by winding a belt T around input pulleys P1 and output pulleys P2. Each pulley P1 has a movable sheave and a fixed sheave sandwiching the belt T therebetween. The movable sheave of the input pulley P1 is moved in the axial direction by the actuator (not shown) including the electric motor. The movable sheave of the output pulley P2 is resiliently biased by a spring (not shown) so as to approach the fixed sheave of the output pulley P2. The actuator of the CVT 44 moves the movable sheave of the input pulley P1 closer to the fixed sheave as the rotational speed of the engine 41 increases. Thus, the reduction ratio of the CVT 44 is controlled according to the rotational speed of the engine 41.

When the neutral position is selected by the forward-reverse lever 83, the controller controls the actuator of the CVT 44 to increase the width between the sheaves of the input pulley P1. Thus, power transmission between the output shaft of the engine 41 and the belt T of the CVT 44 is interrupted.

The gear transmission device 45 includes, in the frame 11, a case 46 fixed on the rear side of the engine 41, a plurality of rotational axes J1, J2, and J3 rotatably arranged in the case 46, and the slide gear G. The plurality of rotational axes J1, J2, and J3 can transmit power using a gear mechanism.

The slide gear G is provided around the rotational axis J2. The slide gear G is connected to the forward-reverse lever 83. When the slide gear G is moved in the axial direction according to the operation of the forward-reverse lever 83, and a gear to which the slide gear G is engaged is changed, the relationship in the rotational direction between the two rotational axes J1 and J3 on the input side and the output side is switched. Power transmitted to the rotational axis J3 is then transmitted to the differential gear device 50 via the gear mechanism. The differential gear device 50 is differentially connected to the two right and left output shafts 56. The differential gear device 50 is located inside the case 46. The two output shafts 56 are respectively connected to the rear wheels 17 and 18 via universal joints 57 and axles 58. Thus, the rear wheels 17 and 18 are driven by the engine 41.

Figure 6:
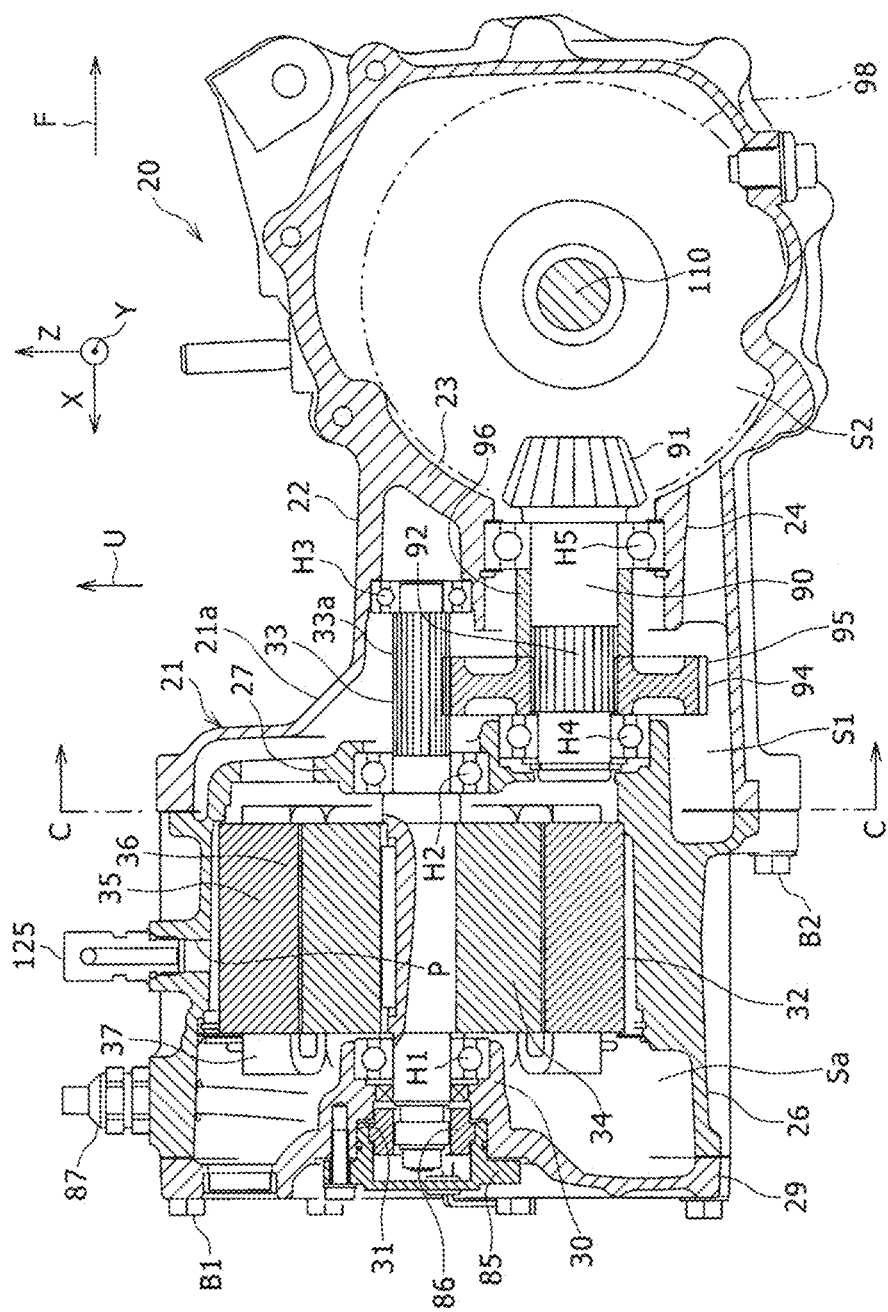
FIG. 6 is a cross-sectional view taken along line A-A in FIG. 5.
Figure 7:
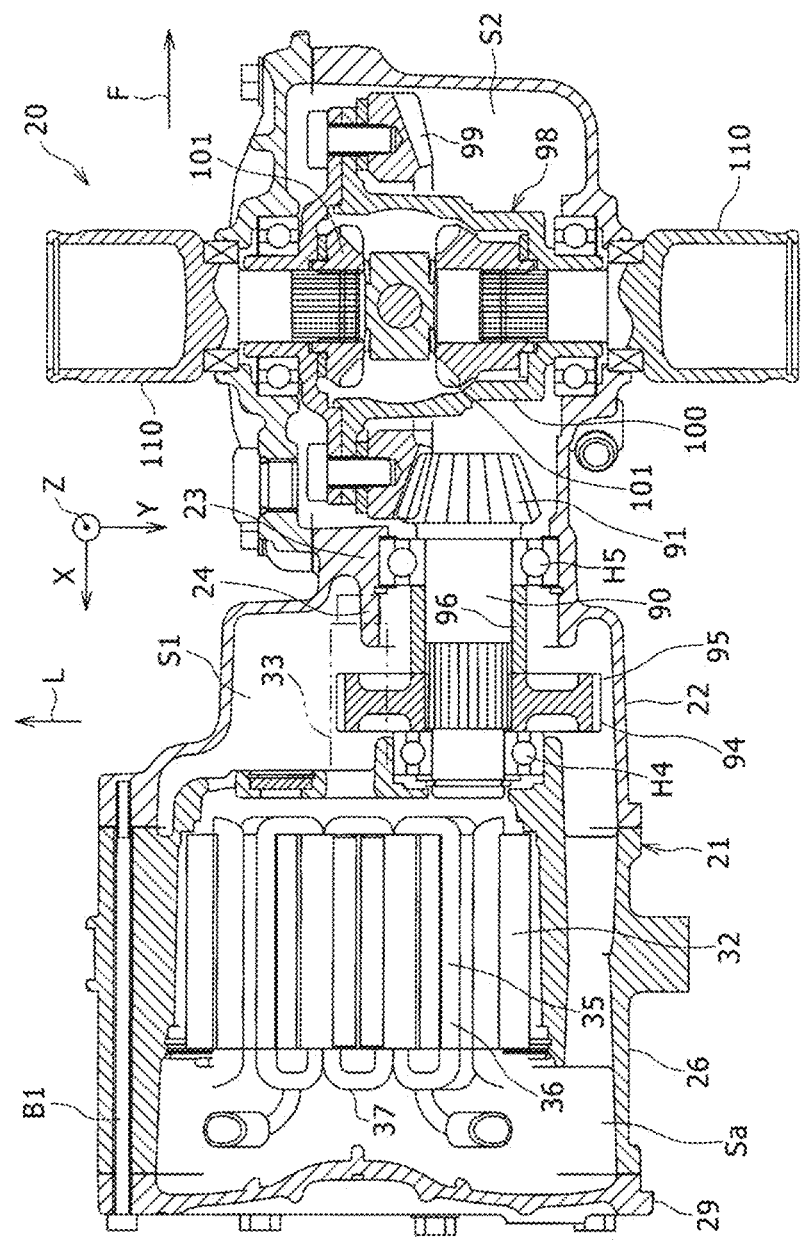
FIG. 7 is a cross-sectional view taken along line B-B in FIG. 4A.
Figure 8:
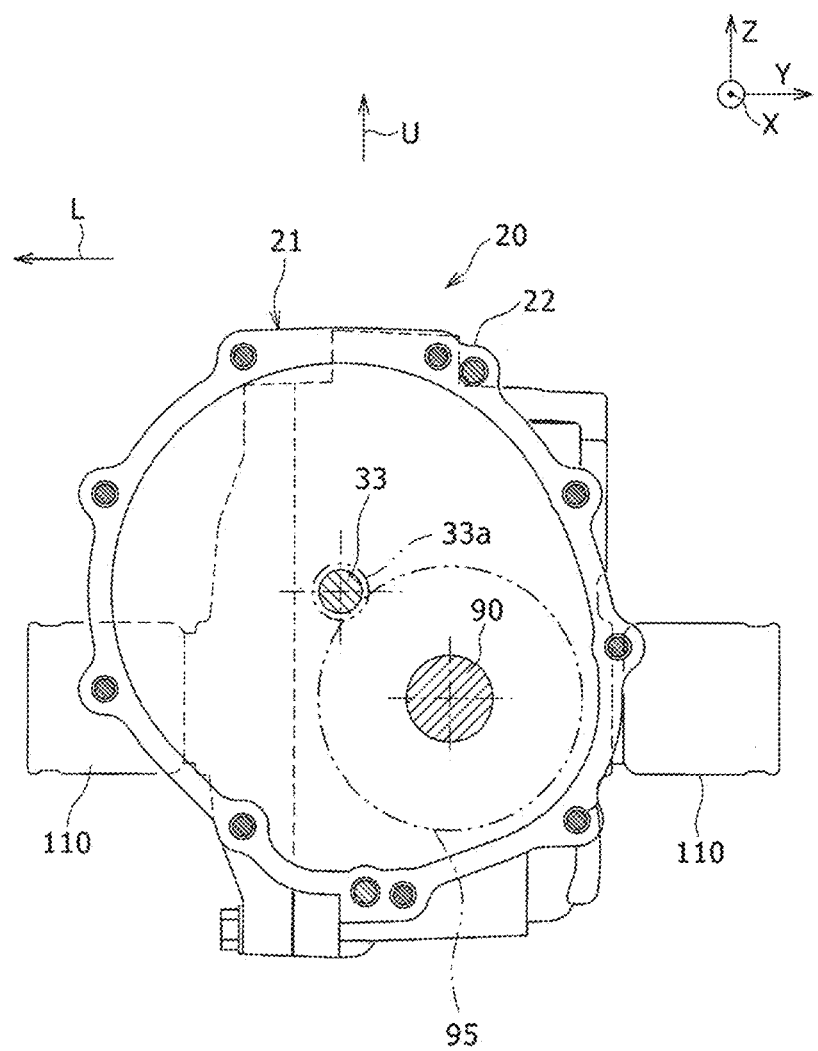
FIG. 8 is a cross-sectional view taken along line C-C in FIG. 6.

FIG. 6 is a cross-sectional view taken along line A-A in FIG. 5. FIG. 7 is a cross-sectional view taken along line B-B in FIG. 4A. FIG. 8 is a cross-sectional view taken along line C-C in FIG. 6. The front moving body drive unit 20 is formed by integrating the case 21, the electric motor 32, a gear shaft 90, an intermediate gear mechanism 94, a differential gear device 98, and two right and left output shafts 110 together.

The case 21 is formed by coupling and integrating a front case element 22 located on the front side, a bottomed cylindrical rear case element 26 located on the rear side, and a cover 29 by means of a plurality of bolts B1. The front case element 22 is abutted against the front end of the rear case element 26 (right end in FIG. 6), and the cover 29 is abutted against the rear end of the rear case element 26 (left end in FIG. 6). The front and rear case elements 22 and 26 and the cover 29 are then coupled together by means of the common bolts B1 extending in the front-and-rear direction X, to thereby reduce the number of parts and the size. The front and rear case elements 22 and 26 are also coupled by means of a bolt B2. The cover 29 closes a rear end opening of the rear case element 26. In this state, the case 21 has a motor installation space Sa, a first gear installation space S1, and a second gear installation space S2 formed therein.

The motor installation space Sa is formed of a space inside the rear case element 26 which is closed with the cover 29 at a rear end. The electric motor 32 described below is installed in the motor installation space Sa. The first gear installation space S1 is formed on the rear side of a partition 23 (left side in FIG. 6) which is formed, in the front case element 22, at an intermediate portion in the front-and-rear direction X. The second gear installation space S2 is formed on the front side of the partition 23 (right side in FIG. 6) of the front case element 22. Thus, the first gear installation space S1 is located between the motor installation space Sa and the second gear installation space S2. These three installation spaces Sa, S1, and S2 are in fluid communication with one another in order to, for example, allow oil for cooling and lubrication to flow therethrough. The first gear installation space S1 houses the front side portion of a motor shaft 33 (right side portion in FIG. 6) and the gear shaft 90 described below. The second gear installation space S2 houses the differential gear device 98 described below.

In addition, a recess 21a is formed, in the upper surface of the case 21, at the intermediate portion in the front-and-rear direction X. The upper surface of the case 21 corresponds to the outer surface of the case 21 on one side in the third direction. The intermediate portion in the front-and-rear direction X of the case 21 corresponds to the intermediate portion in the first direction. The recess 21a is formed in the upper surface of the case 21 so as to include the center position O in the front-and-rear direction X (FIG. 4B). As described below, the motor shaft 33 of the electric motor 32 and the gear shaft 90 are arranged at different positions in the right-and-left direction Y. Thus, it becomes possible to reduce the size of the case 21 in the up-and-down direction Z around the motor shaft 33 and the gear shaft 90. As a result, forming the recess 21a in the case 21 can be easily realized. As shown in FIG. 4B, the recess 21a houses a portion, specifically, a lower portion of the rack portion 71 constituting the rack and pinion mechanism 70.

The case 21 is fixed to the front side of the frame 11 by means of brackets (not shown) fixed to the frame 11 and fastening members, such as bolts. For example, as shown in FIG. 4A, screw holes 21b and 21c are formed at two positions on both the right and left sides of the upper front end portion (right side in FIG. 4A) and the lower rear end portion (left side in FIG. 4A) of the case 21, respectively. Screw portions of the bolts penetrating through holes formed in the brackets are coupled to the screw holes 21b and 21c, to thereby fix the case 21 to the frame 11.

The electric motor 32 is, for example, a permanent magnet three-phase motor as shown in FIG. 6 and FIG. 7. The electric motor 32 is located on the rear side in the case 21 (left side in FIG. 6 and FIG. 7). The rear side corresponds to the one side in the predetermined first direction. Specifically, the electric motor 32 has the motor shaft 33 extending in the front-and-rear direction X, a cylindrical rotor core 34 fixed around the motor shaft 33, a generally cylindrical stator core 35, and a three-phase stator coil 37. The rotor core 34 and the stator core 35 are made of magnetic materials, such as iron and silicon steel. The stator core 35 is fixed to the inside of the rear case element 26. A plurality of teeth 36 protruding to the inner circumferential side are formed at a plurality of positions on the inner circumferential surface of the stator core 35. The three-phase stator coil 37 is wound around the plurality of teeth 36 by distributed winding or concentrated winding.

The rotor core 34 is located so as to face the inside of the stator core 35 in the radial direction. Permanent magnets (not shown) that are, for example, magnetized in the radial direction are fixed at a plurality of circumferential positions on the rotor core 34.

Both end portions of the motor shaft 33 in the front-and-rear direction X protrude from both side surfaces of the rotor core 34 in the front-and-rear direction X. The rear end portion of the motor shaft 33 penetrates through the inside of a cylindrical portion 30 which is formed in the center portion of the cover 29 so as to protrude to the motor installation space Sa side. The rear end portion of the motor shaft 33 is supported rotatably with respect to the case 21 by a bearing H1 fixed to the inside of the cylindrical portion 30. On the rear side surface (left side surface in FIG. 6) of the cover 29, a cap 85 is fixed to the circumference of an opening of a hole 31 in communication with the inside of the cylindrical portion 30. The cap 85 has a bottomed cylindrical shape with a flange. The cap 85 seals the inside of the hole 31 from the outside of the case 21.

Further, a rotational speed detection unit 86 is located between the outer circumferential surface of the rear end portion of the motor shaft 33 (left end portion in FIG. 6) and the cap 85. The rotational speed detection unit 86 detects the rotational speed of the motor shaft 33. An angle detection unit for detecting the rotational angle of the motor shaft 33 may be provided in place of the rotational speed detection unit 86. A detection signal from the rotational speed detection unit 86 or the angle detection unit is transmitted to the controller via a cable. If the detection signal is transmitted from the angle detection unit to the controller, the controller calculates the rotational speed of the motor shaft 33 based on that detection signal. The rotational speed detection unit and the angle detection unit are configured to include a resolver, for example.

The front side portion of the motor shaft 33 (right side portion in FIG. 6) is located in the first gear installation space S1 through a hole formed in a bottom plate 27 of the rear case element 26. The front side portion of the motor shaft 33 is supported rotatably with respect to the case 21 by a bearing H2 fixed to a hole in the bottom plate 27 and a bearing H3 fixed to the inside of the front case element 22. A first gear portion 33a is directly formed on the front side portion of the motor shaft 33 between the two bearings H2 and H3. The first gear portion 33a is a helical gear, for example. The first gear portion 33a meshes with a second gear portion 95 fixed to the gear shaft 90 described below.

A power line derived from the three-phase stator coil 37 is connected to three connectors 87 that are fixed to the upper end portion of the rear case element so as to protrude therefrom. Electric power from the battery is output to an inverter (not shown), and a three-phase wire (not shown) connected to the inverter is connected to the three connectors 87. The battery is located, for example, below the driver's seat 14 or the cargo bed 19 of the vehicle. The inverter converts DC power to three-phase AC power. When the electric motor is driven, the controller controls the inverter to output three-phase AC power to the three-phase stator coil 37 via the three connectors 87. Therefore, a rotating magnetic field is generated in the stator core 35, and the rotating magnetic field causes the rotor core 34 and the motor shaft 33 to rotate. The electric motor may be other than the three-phase permanent magnet motor and may be a DC motor or an induction motor, for example.

The gear shaft 90 extends in the front-and-rear direction X and has a bevel gear 91 formed on the front end portion thereof (right end portion in FIG. 6). The front side of the gear shaft 90 corresponds to the other side in the first direction. The bevel gear 91 is, for example, a spiral bevel gear. The gear shaft 90 is located, inside the rear side portion of the front case element 22 (left side portion in FIG. 6), in parallel to the front side portion of the motor shaft 33. Particularly, as shown in FIG. 6 to FIG. 8, the gear shaft 90 is located below the motor shaft 33 and on the right side of the motor shaft 33 (lower side in FIG. 7 and right side in FIG. 8). Thus, the motor shaft 33 and the gear shaft 90 are arranged at different positions in both the right-and-left direction Y and the up-and-down direction Z. Therefore, as in the present example, when the motor shaft 33 and the gear shaft 90 are arranged to extend in the front-and-rear direction X of the vehicle 10, it is possible to reduce the size of the moving body drive unit 20 in the right-and-left direction Y and in the up-and-down direction Z around the motor shaft 33 and the gear shaft 90, as described below.

The rear end portion of the gear shaft 90 (left end portion in FIG. 6) is supported rotatably with respect to the case 21 by a bearing H4 fixed to a hole formed in the bottom plate 27 of the rear case element 26. The front end portion of the gear shaft 90 (right end portion in FIG. 6) is supported rotatably with respect to the case 21 by a bearing H5 fixed to the inside of a cylindrical portion 24 formed to protrude from the partition 23 of the front side case element 22 to the rear side (left side in FIG. 6).

The gear shaft 90 has a male spline 92 on its outer circumferential surface between the two bearings H4 and H5. The male spline 92 is spline-engaged with the inner circumferential surface of the second gear portion 95, thereby fixing the second gear portion 95 to the gear shaft 90. The second gear portion 95 is sandwiched between the two bearings H4 and H5 in the front-and-rear direction X via a cylindrical collar 96. The second gear portion 95 meshes with the first gear portion 33a formed on the motor shaft 33. The intermediate gear mechanism 94 is formed to include the first gear portion 33a and the second gear portion 95. Thus, the intermediate gear mechanism 94 transmits power from the motor shaft 33 to the gear shaft 90.

The differential gear device 98 is located in the second gear installation space S2 of the front case element 22. The differential gear device 98 includes a ring gear 99 meshing with the bevel gear 91 of the gear shaft 90, a differential gear case 100 to which the ring gear 99 is fixed, a pinion gear (not shown) rotatably supported by the differential gear case 100, and two side gears 101 arranged on both right and left sides in the differential gear case 100 for meshing with the pinion gear. The two side gears 101 are fixed to one end portion of each of the right and left output shafts 110.

The two output shafts 110 are arranged separately on both sides in the right-and-left direction Y and respectively extend in the right-and-left direction Y. The other end portions of the two output shafts 110 protrude outward in the right-and left direction Y from both side ends of the case 21. Thus, the two output shafts 110 are differentially connected to the differential gear device 98. As shown in FIG. 2, the output shafts 110 are respectively connected to the front wheels 15 and 16 via universal joints 112 and axles 114. Therefore, power from the electric motor 32 is transmitted to the two front wheels 15 and 16 via the gear shaft 90 and the differential gear device 98, thereby driving the two front wheels 15 and 16.

Further, as shown in FIG. 4A, a first oil passage joint 116 is connected to the lower end portion of the right surface of the front end portion of the case 21 (right end portion in FIG. 4A). The inside of the first oil passage joint 116 is in communication with the second gear installation space S2 of the case 21. A second oil passage joint 118 is connected to the upper surface of the rear end portion of the case 21 (left end portion in FIG. 4A). The inside of the second oil passage joint 118 is in communication with the motor installation space S a of the case 21. The first oil passage joint 116 and the second oil passage joint 118 are connected to a tube that forms an oil passage 120 outside the case 21. The oil passage 120 includes an oil circulation pump 121 and an oil cooler 123. Oil discharged from the first oil passage joint 116 is sucked by the oil circulation pump 121 and cooled by the oil cooler 123. The oil is then transported to the second oil passage joint 118. The oil transported from the second oil passage joint 118 to the inside of the case 21 flows inside the motor installation space Sa shown in FIG. 6 downward from the upper side of the stator core 35 of the electric motor 32 through both sides in the front-and-rear direction X. At this time, the oil cools coil ends that are both end portions of the stator coil 37 in the front-and-rear direction X. The oil flowing to the lower portion of the motor installation space Sa is transported to the second gear installation space S2 through the first gear installation space S1. The oil is then returned from the second gear installation space S2 to the oil passage 120 through the first oil passage joint 116 (FIG. 4A). Thus, the oil is circulated through the oil passage 120, the motor installation space Sa, and the first and second gear installation spaces S1 and S2, and the circulation cools the electric motor 32 shown in FIG. 6 and lubricates the intermediate gear mechanism 94 and the differential gear device 98. The positions of the oil passage 120, the oil circulation pump 121, and the oil cooler 123 shown in FIG. 4A are shown only for illustrating the oil circulation circuit, and they are actually arranged so as not to interfere with the surrounding parts, such as the rack and pinion mechanism 70 shown in FIG. 4B. Further, FIG. 6 shows that the second oil passage joint 118 (FIG. 4A) is removed, and that an opening of a port P to which the second oil passage joint 118 is connected is closed with a sealing member 125. This sealing member 125 is attached when the product that is the moving body drive unit 20 is transported. When the product that is the moving body drive unit 20 is transported, a sealing member is also attached to a port (not shown) to which the first oil passage joint 116 (FIG. 4A) is connected.

In the moving body drive unit 20 and the vehicle 10 described above, the motor shaft 33 and the gear shaft 90 are arranged at different positions in both the right-and-left direction Y and the up-and-down direction Z. Therefore, when the motor shaft 33 and the gear shaft 90 are arranged to extend in the front-and-rear direction X of the vehicle 10, it is possible to reduce the size of the moving body drive unit 20 around the motor shaft 33 and the gear shaft 90 in the right-and-left direction Y and in the up-and-down direction Z. It thus becomes easier to dispose the moving body drive unit 20 in a narrow space in the vehicle 10 while preventing interference between the moving body drive unit 20 and the surrounding parts. In addition, by arranging the motor shaft 33 and the gear shaft 90 along the front-and-rear direction X and disposing the electric motor 32 on the rear side of the differential gear device 98, it becomes easier to lower the center of gravity of the vehicle 10 and bring that center of gravity closer to the center position between the front wheels and the rear wheels in the front-and-rear direction X. It is thus possible to improve the maneuverability and the stability of the vehicle 10.

In addition, because the recess 21a is formed, in the upper surface of the case 21, at the intermediate portion in the front-and-rear direction X, and a portion of the rack portion 71 is located inside this recess 21a, it becomes easier to dispose the moving body drive unit 20 closer to the rack and pinion mechanism 70.

Further, the intermediate gear mechanism 94 includes the first gear portion 33a directly formed on the motor shaft 33 and the second gear portion 95 fixed to the gear shaft 90 and meshing with the first gear portion 33a. Thus, the first gear portion 33a and the second gear portion 95 can be arranged closer to each other, and it is therefore possible to make the contour of the moving body drive unit 20 smaller around the motor shaft 33 and the gear shaft 90.

The intermediate gear mechanism may be configured to include the first gear portion directly formed on the gear shaft and the second gear portion fixed to the motor shaft and meshing with the first gear portion.

Although the case where the steering effort converting mechanism is the rack and pinion mechanism 70 has been described above, the steering effort converting mechanism may be a ball screw mechanism including a ball nut and a screw shaft, and the ball screw mechanism may be used to convert the force in the rotational direction of the steering shaft to the force for steering the two front wheels. The steering effort converting mechanism may include a power steering device that assists the steering effort by means of the electric motor. At least a portion of the ball screw mechanism or the power steering device may be located inside the recess 21a of the case 21 of the moving body drive unit 20.

Further, although, in the above description, the gear shaft 90 has been located on the right side of the motor shaft 33 and below the motor shaft 33 in the moving body drive unit 20, the positional relationship between the gear shaft and the motor shaft in the up-and-down direction and in the right-and-left direction may be opposite in one or both of those directions.

The invention claimed is:

1. A moving body comprising right and left steerable front wheels and at least one rear wheel, the moving body comprising:
   a moving body drive unit;
   a steering wheel; and
   a steering effort converting mechanism that converts a force in a rotational direction of the steering wheel to the force for steering the two right and left front wheels,
   wherein the moving body drive unit is used for driving the right and left front wheels, and comprises:
      a case;
      an electric motor that is located, inside the case, on one side in a predetermined first direction and has a motor shaft extending in the first direction;
      a gear shaft that is located, inside the case, parallel to the motor shaft so as to extend in the first direction and has a bevel gear formed on another side in the first direction;
      an intermediate gear mechanism that transmits power from the motor shaft to the gear shaft and
      a differential gear device that is located, inside the case, on another side in the first direction, the differential gear device having a ring gear that meshes with the bevel gear and transmitting power from the gear shaft to two output shafts that are arranged separately on both sides in a right-and-left direction as a second direction orthogonal to the first direction and extend in the right-and-left direction,
   the motor shaft and the gear shaft are arranged at different positions in both the right-and-left direction and in a third direction that is orthogonal to both the first direction and the right-and-left direction,
   each of the two output shafts is connected to a corresponding one of the right and left front wheels,
   the case has a recess formed, in an upper surface as an outer surface on one side in the third direction, at an intermediate portion in a front-and-rear direction which is the first direction, and
   at least a portion of the steering effort converting mechanism is located inside the recess.

2. The moving body according to claim 1, wherein the steering effort converting mechanism is a rack and pinion mechanism.

* * * * *